US010351152B2

United States Patent
Hsieh et al.

(10) Patent No.: US 10,351,152 B2
(45) Date of Patent: Jul. 16, 2019

(54) CART FOR TRANSPORTING FOLDED TABLES AND/OR FOLDED CHAIRS

(71) Applicants: Chen Huang Hsieh, Keelung (TW); Yiting Hsieh, Keelung (TW)

(72) Inventors: Chen Huang Hsieh, Keelung (TW); Yiting Hsieh, Keelung (TW)

( * ) Notice: Subject to any disclaimer, the term of this patent is extended or adjusted under 35 U.S.C. 154(b) by 0 days.

(21) Appl. No.: 16/000,906

(22) Filed: Jun. 6, 2018

(65) Prior Publication Data

US 2018/0354538 A1 Dec. 13, 2018

(30) Foreign Application Priority Data

Jun. 8, 2017 (TW) .............................. 106208426 U

(51) Int. Cl.
*B62B 3/10* (2006.01)

(52) U.S. Cl.
CPC .......... *B62B 3/108* (2013.01); *B62B 2202/30* (2013.01); *B62B 2202/32* (2013.01)

(58) Field of Classification Search
CPC ............................. B62B 3/108; B62B 2202/32
See application file for complete search history.

(56) References Cited

U.S. PATENT DOCUMENTS

| | | | | |
|---|---|---|---|---|
| 3,031,084 A * | 4/1962 | Mugler | ................ | A47B 3/0815 108/16 |
| 3,889,814 A * | 6/1975 | Rice | ........................ | A47F 7/30 211/27 |
| 4,033,597 A * | 7/1977 | Boyer | ...................... | B62B 3/108 211/41.14 |
| 5,226,656 A * | 7/1993 | Mayer | ...................... | B62B 3/108 269/17 |
| 5,871,219 A * | 2/1999 | Elliott | ...................... | B62B 3/108 280/47.34 |
| 6,296,262 B1* | 10/2001 | Skinner | ................... | B62B 3/108 280/35 |
| 2001/0013690 A1* | 8/2001 | Sexton | .................... | B62B 3/108 280/79.7 |
| 2003/0164602 A1* | 9/2003 | Kuhlman | ................ | B62B 3/108 280/79.7 |
| 2004/0130113 A1* | 7/2004 | Iwanicki | ................. | B62B 3/108 280/47.34 |
| 2009/0194958 A1* | 8/2009 | Lin | ......................... | B62B 3/108 280/47.35 |
| 2009/0315289 A1* | 12/2009 | Brandon | ................. | B62B 3/108 280/79.11 |

(Continued)

Primary Examiner — Brian L Swenson

(57) ABSTRACT

A cart for transporting folded tables and/or folded chairs includes rear and front boards; a lower left side bar interconnecting the rear board and the front board; a lower right side bar interconnecting the rear board and the front board; first grooves vertically oriented and formed on the lower left side bar; second grooves vertically oriented and formed on the lower right side bar; an upper left side bar interconnecting the rear board and the front board; an upper right side bar interconnecting the rear board and the front board; first troughs oriented horizontally and formed on the upper left side bar; second troughs oriented horizontally and formed on the upper right side bar; and a pivotal handle secured to a rear surface of the rear board. The first grooves are aligned with the second grooves. The first troughs are aligned with the second troughs.

3 Claims, 32 Drawing Sheets

(56) References Cited

U.S. PATENT DOCUMENTS

2011/0304109 A1* 12/2011 Cummins ................. B62B 3/12
  280/29
2014/0284893 A1* 9/2014 Faber ........................ B42F 7/14
  280/79.2

* cited by examiner

CART FOR TRANSPORTING FOLDED TABLES AND/OR FOLDED CHAIRS

BACKGROUND OF THE INVENTION

1. Field of the Invention

The invention relates to carts and more particularly to a cart for transporting folded tables and/or folded chairs.

2. Description of Related Art

Folding tables and/or folded chairs are widely used in restaurants, etc due to space saving. How to conveniently transport the folded tables and/or folded chairs is an issue to be addressed.

As shown in FIG. 1, a conventional first folding table 3 is shown in its folded state. As shown in FIG. 1A, the conventional first folding table 3 is shown in its unfolded state.

As shown in FIG. 2, a conventional second folding table 30 is shown in its folded state. As shown in FIG. 2A, the conventional second folding table 30 is shown in its unfolded state.

As shown in FIG. 3, a conventional first folding chair 4 is shown in its folded state. As shown in FIG. 3A, the conventional first folding chair 4 is shown in its unfolded state.

As shown in FIG. 4, a conventional second folding chair 5 is shown in its folded state. As shown in FIG. 4A, the conventional second folding chair 5 is shown in its unfolded state.

It is often that there is a need of transporting a great number of the conventional folding tables and/or chairs in their folded states to another position. However, there is no cart commercially available for conveyance of the folded tables and/or chairs.

Thus, the need for improvement still exists.

SUMMARY OF THE INVENTION

It is therefore one object of the invention to provide a cart for transporting folded tables and/or folded chairs comprising a rear board; a front board; a lower left side bar interconnecting both the rear board and the front board; a lower right side bar interconnecting both the rear board and the front board; a plurality of wheels rotatably mounted on both the lower left side bar and the lower left side bar; a plurality of first grooves vertically oriented and formed on the lower left side bar; a plurality of second grooves vertically oriented and formed on the lower right side bar; an upper left side bar interconnecting both the rear board and the front board; an upper right side bar interconnecting both the rear board and the front board; a plurality of first troughs oriented in a predetermined direction and formed on the upper left side bar; a plurality of second troughs oriented in a predetermined direction and formed on the upper right side bar; a fastener disposed on a rear surface of the rear board; and a handle having a bottom end pivotably secured to the rear surface of the rear board and configured to be fastened by the fastener; wherein each of the first grooves is aligned with a corresponding one of the second grooves, and each of the first troughs is aligned with a corresponding one of the second troughs.

The above and other objects, features and advantages of the invention will become apparent from the following detailed description taken with the accompanying drawings.

DETAILED DESCRIPTION OF THE INVENTION

Figure 1:
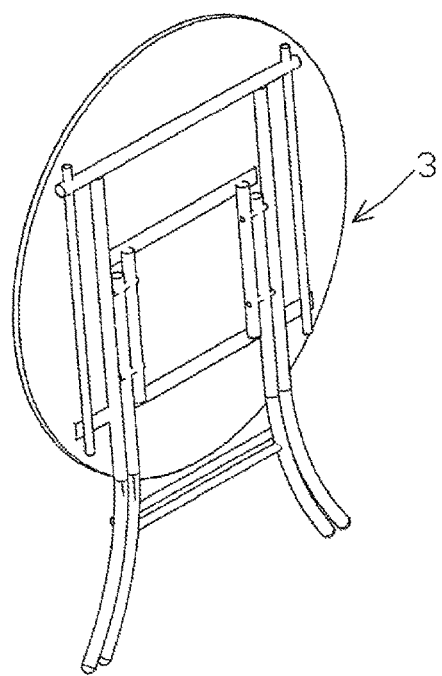
FIG. 1 is a perspective view of a conventional first folding table in its folded state.
Figure 1A:
FIG. 1A is a perspective view of the conventional first folding table in its unfolded state.
Figure 2:
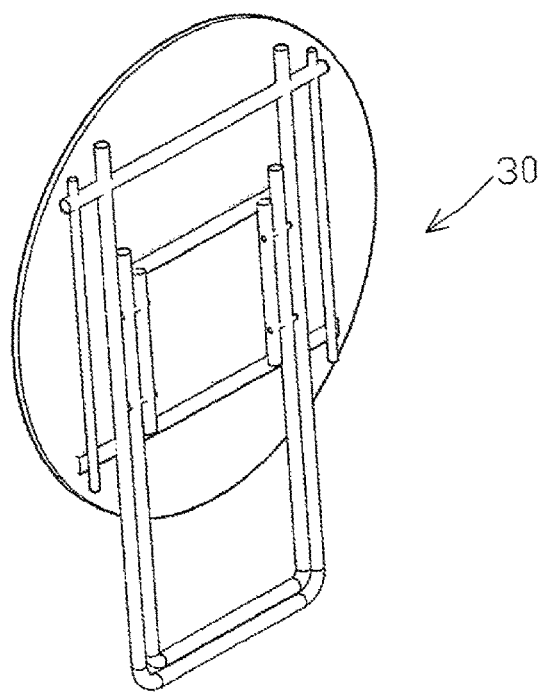
FIG. 2 is a perspective view of a conventional second folding table in its folded state.
Figure 2A:
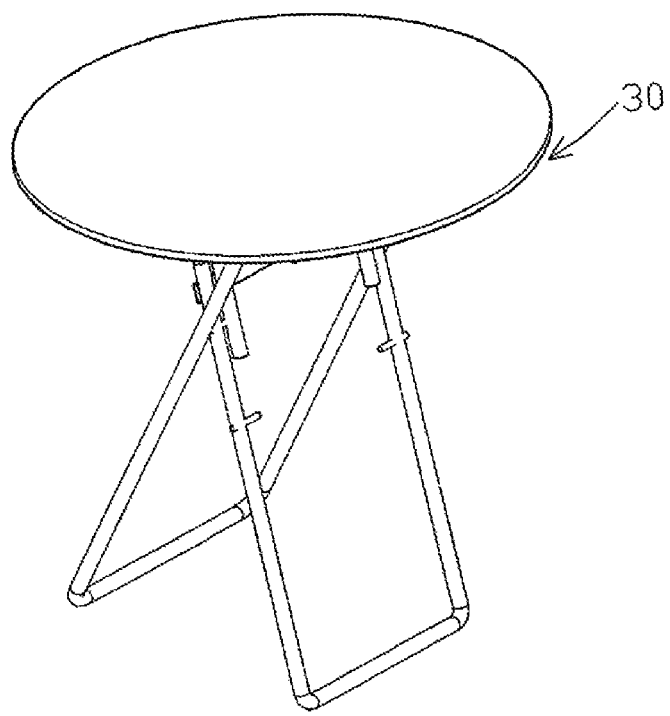
FIG. 2A is a perspective view of the conventional second folding table in its unfolded state.
Figure 3:
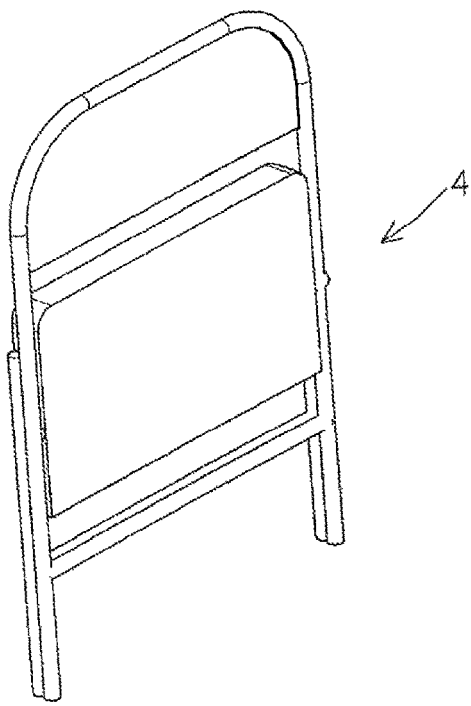
FIG. 3, it is a perspective view of a conventional first folding chair in its folded state.
Figure 3A:
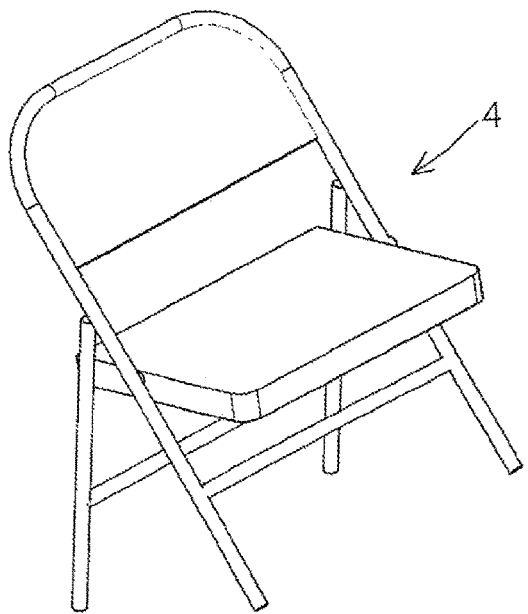
FIG. 3A is a perspective view of the conventional first folding chair in its unfolded state.
Figure 4:
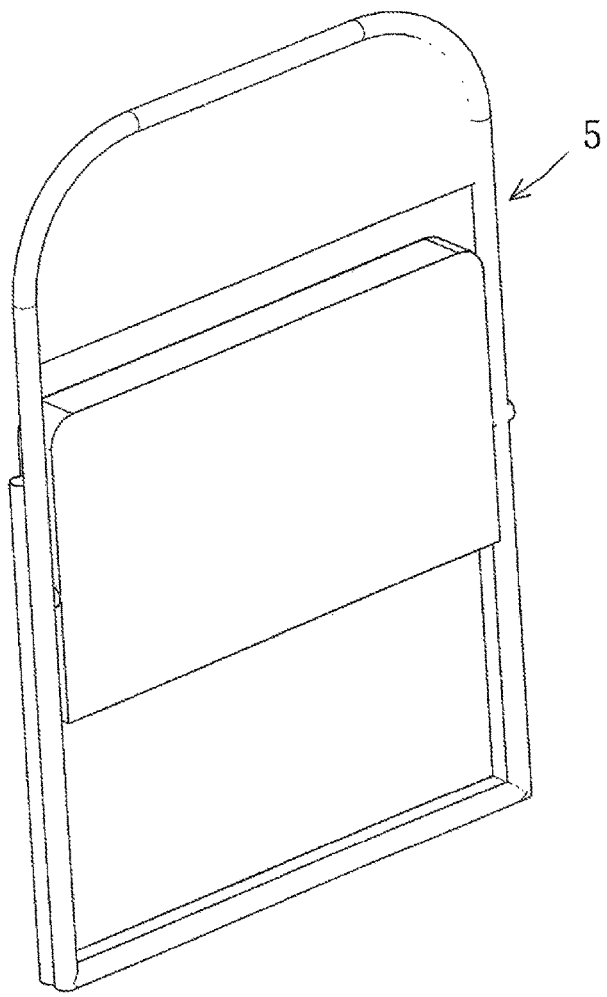
FIG. 4 is a perspective view of a conventional second folding chair in its folded state.
Figure 4A:
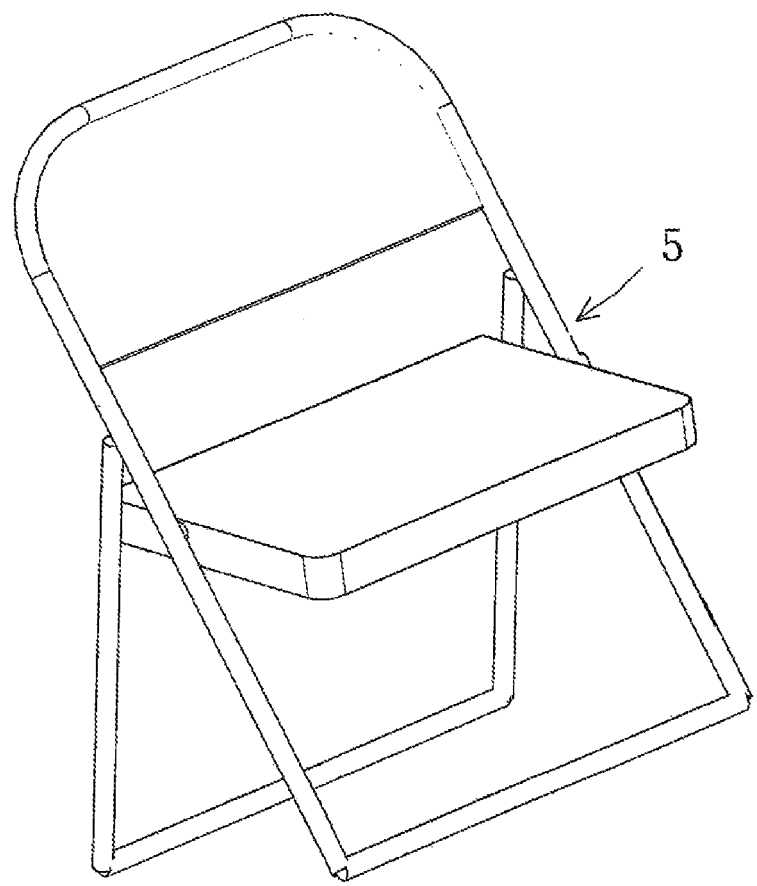
FIG. 4A is a perspective view of the conventional second folding chair in its unfolded state.
Figure 5:
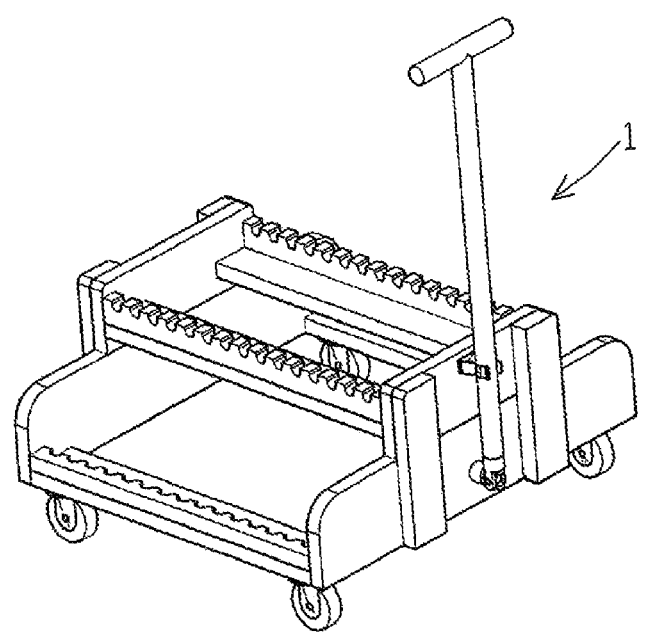
FIG. 5 is a perspective view of a cart for transporting folded tables and/or folded chairs according to a first preferred embodiment of the invention.
Figure 5A:
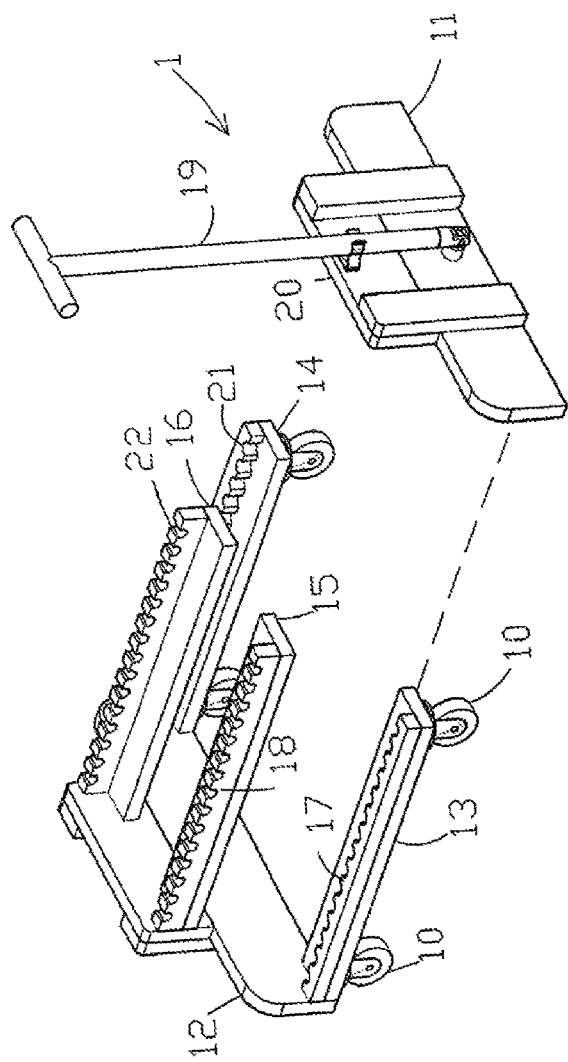
FIG. 5A is an exploded view of the cart of FIG. 5.
Figure 5B:
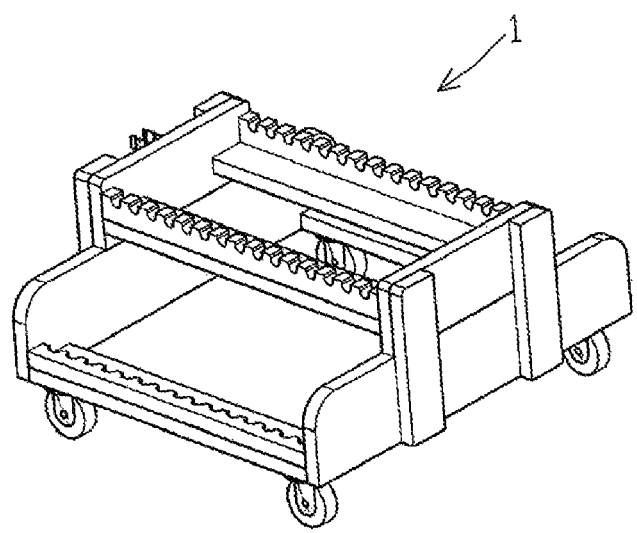
FIG. 5B is another perspective view of the cart of FIG. 5 with the removed.
Figure 6:
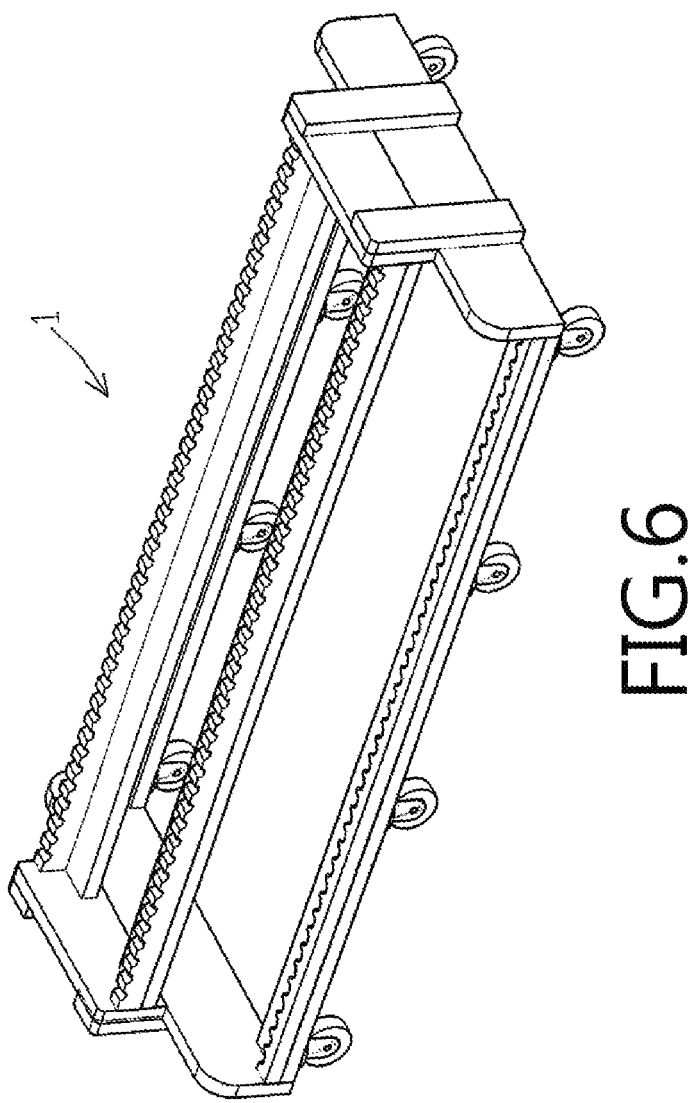
FIG. 6 is another configuration of the cart shown in FIG. 5, the cart having a much increased length.

Referring to FIGS. 5 to 6, a cart 1 for transporting folded tables and/or folded chairs in accordance with a first preferred embodiment of the invention comprises a rear board 11, a front board 12, a lower left side bar 13 interconnecting one ends of both the rear board 11 and the front board 12, a lower right side bar 14 interconnecting the other ends of both the rear board 11 and the front board 12, four wheels 10 rotatably mounted on a front end of a bottom of the lower left side bar 13, a rear end of the bottom of the lower left side bar 13, a front end of a bottom of the lower right side bar 14, and a rear end of the bottom of the lower right side bar 14 respectively, a plurality of first grooves 17 vertically oriented and formed on the lower left side bar 13, a plurality of second grooves 21 vertically oriented and formed on the lower right side bar 14, an upper left side bar 15 interconnecting one ends of upper portions of both the rear board 11 and the front board 12, an upper right side bar 16 interconnecting the other ends of the upper portions of both the rear board 11 and the front board 12, a plurality of first troughs 18 horizontally oriented and formed on the upper left side bar 15, a plurality of second troughs 22 horizontally oriented and formed on the upper right side bar 16, a fastener 20 disposed on an upper central portion of a rear surface of the rear board 11, and a T-shape handle 19 having a bottom end pivotably secured to a lower central portion of the rear surface of the rear board 11 and being temporarily fastened by the fastener 20 in which each first groove 17 is aligned with a corresponding second groove 21, each first trough 18 is aligned with a corresponding second trough 22, and a distance between the lower left side bar 13 and the lower right side bar 14 is greater than that between the upper left side bar 15 and the upper right side bar 16.

As shown in FIG. 6, it shows another configuration of the cart 1 having a much increased length.

Figure 7:
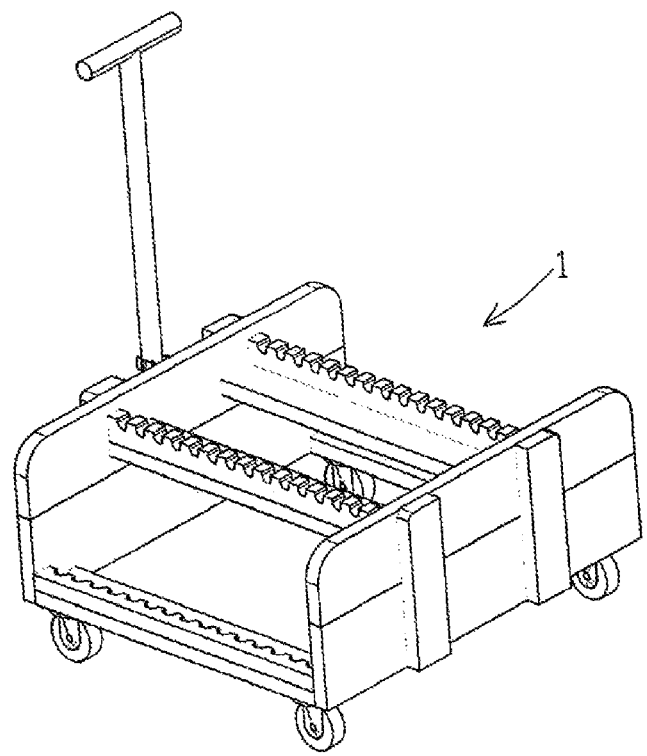
FIG. 7 is a perspective view of a cart for transporting folded tables and/or folded chairs according to a second preferred embodiment of the invention.
Figure 7A:
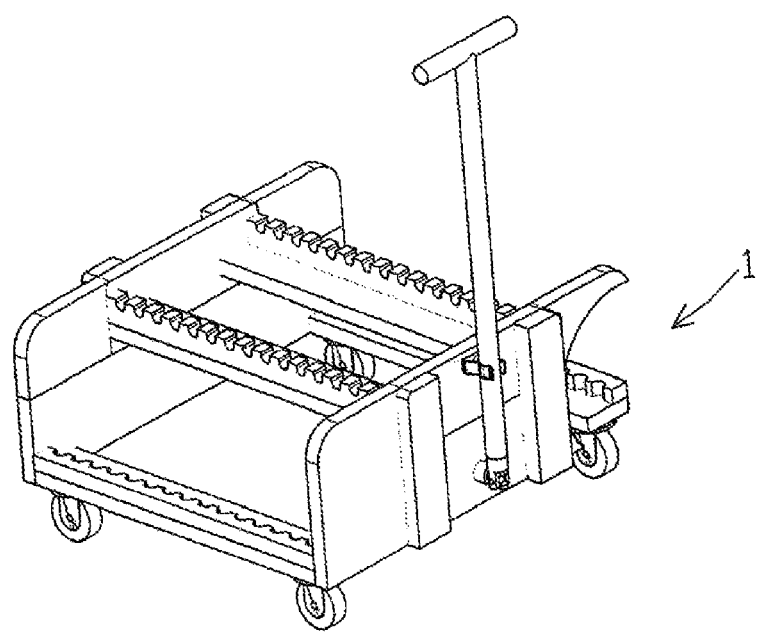
FIG. 7A is another perspective view of the cart of FIG. 7 with a portion removed.
Figure 7B:
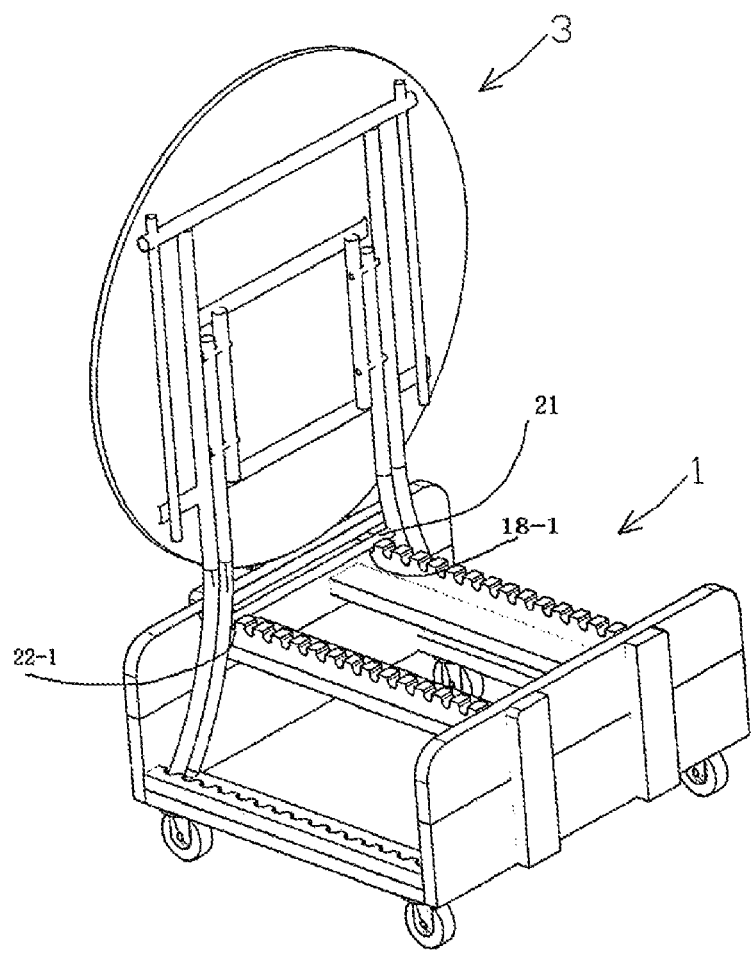
FIG. 7B is a view similar to FIG. 7 showing the conventional first folding table in its folded state positioned on the cart.
Figure 7C:
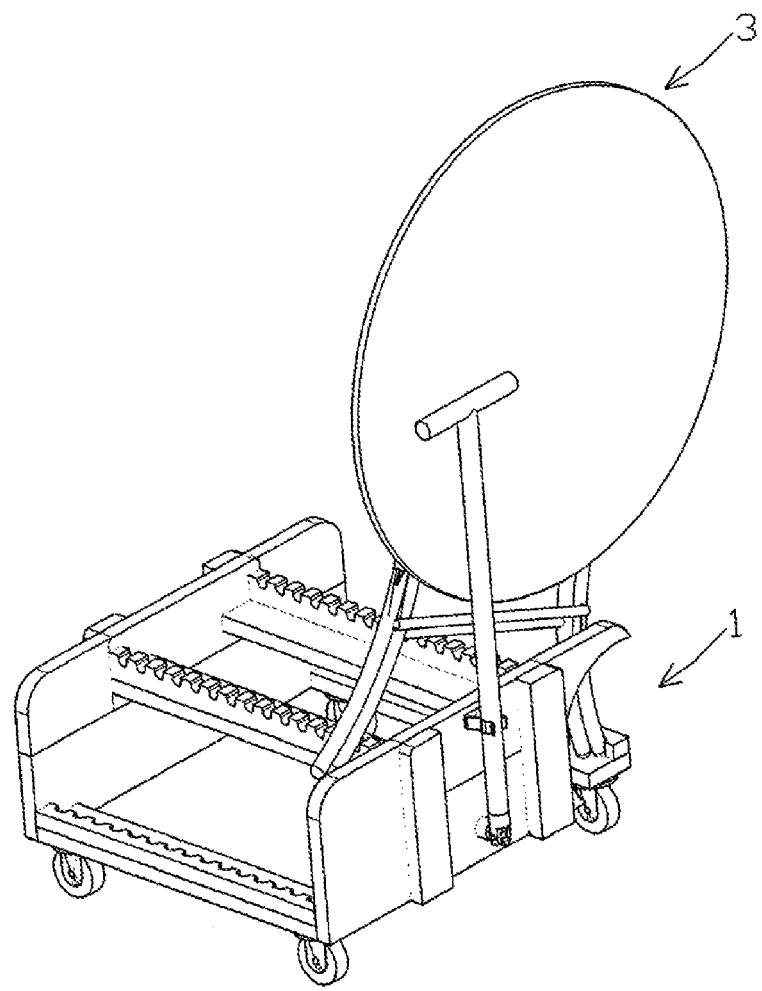
FIG. 7C is another view of FIG. 7A showing the conventional first folding table in its folded state being positioned on the cart.
Figure 7D:
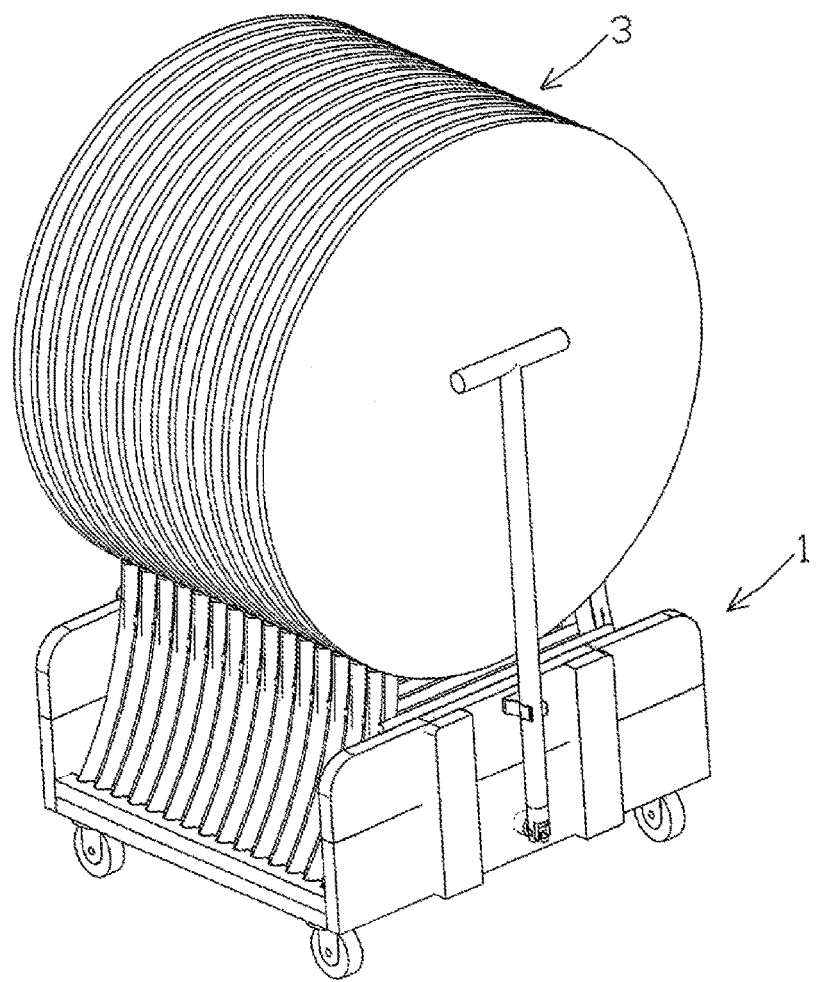
FIG. 7D is a perspective view of the cart of FIG. 7 with a plurality of the conventional first folding tables in their folded states positioned on the cart.
Figure 7E:
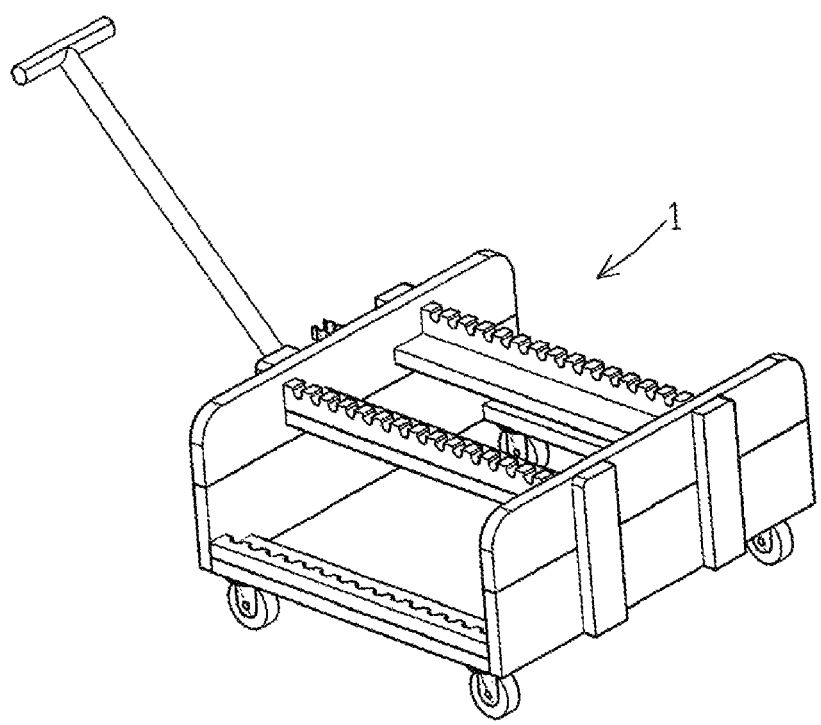
FIG. 7E is a view similar to FIG. 7 showing the T-shape handle being in an inclined state.

Referring to FIGS. 7 to 7E, a cart 1 for transporting folded tables and/or folded chairs in accordance with a second preferred embodiment of the invention is shown. The characteristics of the second preferred embodiment are substantially the same as that of the first preferred embodiment except the following: Both the front board and the rear board are rectangular. The conventional first folding table 3 can be positioned on and between the first groove 17 and its corresponding second groove 21 so that a plurality of the conventional first folding tables 3 can be positioned on the cart 1.

Figure 8:
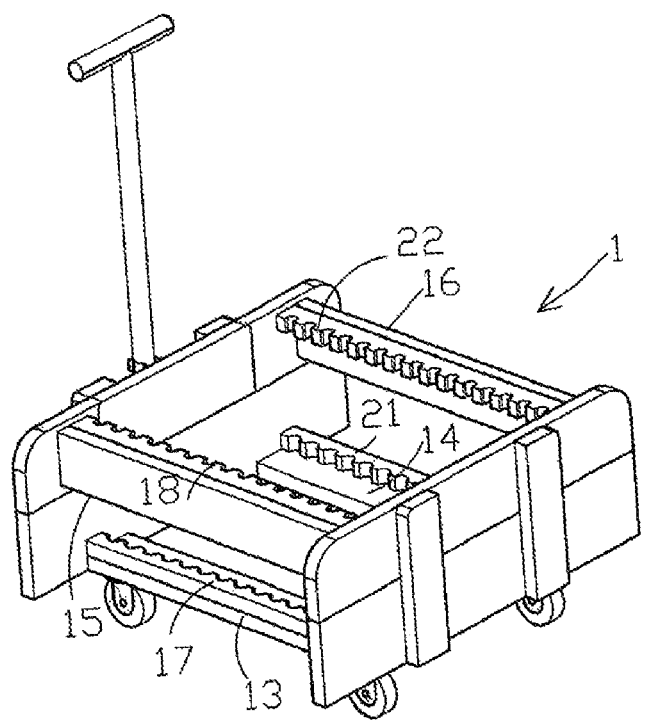
FIG. 8 is a perspective view of a cart for transporting folded tables and/or folded chairs according to a third preferred embodiment of the invention.
Figure 8A:
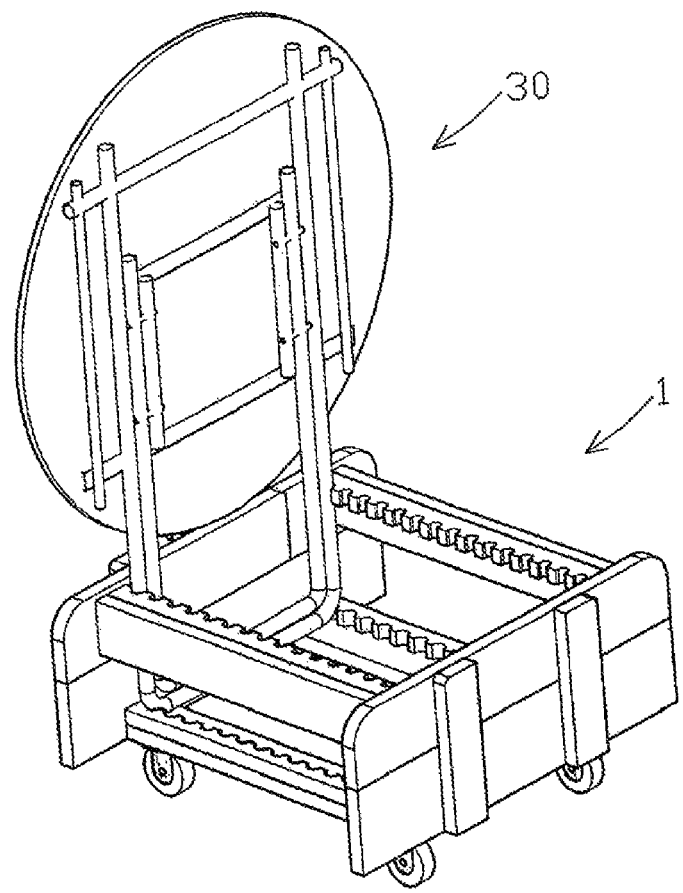
FIG. 8A is a perspective view showing the cart of FIG. 8 with the conventional second folding table in their folded states being positioned on the cart.
Figure 8B:
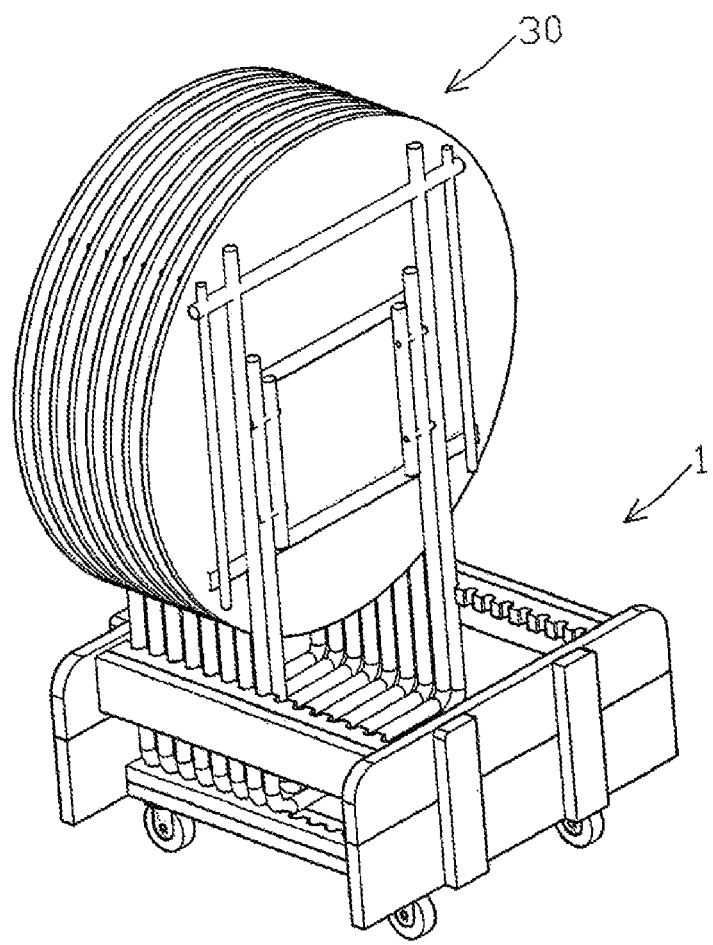
FIG. 8B is a view similar to FIG. 8A showing a plurality of the conventional second folding tables in their folded states being positioned on the cart.

Referring to FIGS. 8 to 8B, a cart 1 for transporting folded tables and/or folded chairs in accordance with a third preferred embodiment of the invention is shown. The characteristics of the third preferred embodiment are substantially the same as that of the second preferred embodiment except the following: Both the first troughs 18 and the second troughs 22 are vertically oriented, and a distance between the first trough 18 and its corresponding second trough 22 is equal to that between the first groove 17 and its corresponding second groove 21 so that a plurality of the conventional second folding tables 30 can be positioned on the cart 1.

Figure 9:
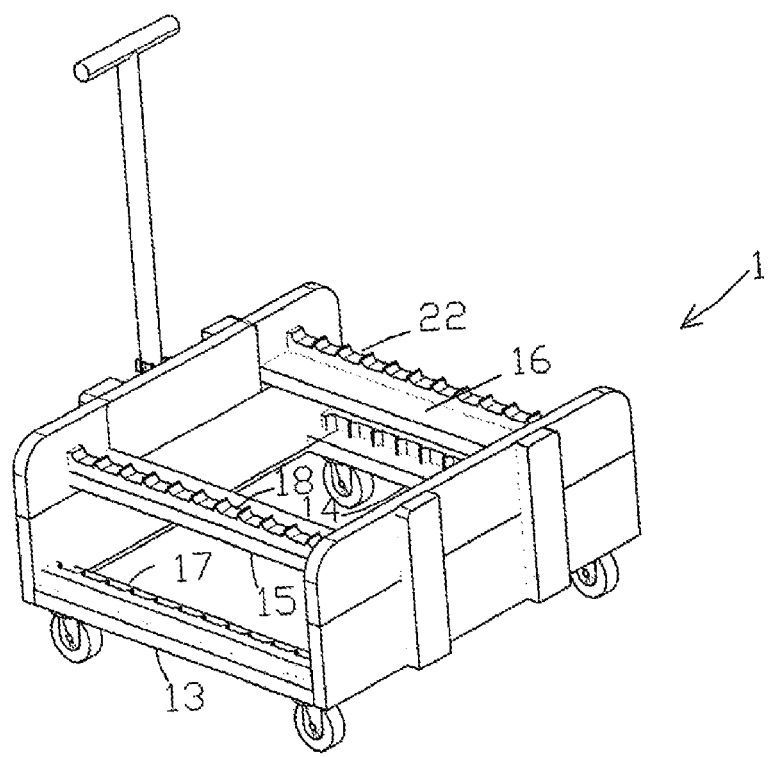
FIG. 9 is a perspective view of a cart for transporting folded tables and/or folded chairs according to a fourth preferred embodiment of the invention.
Figure 9A:
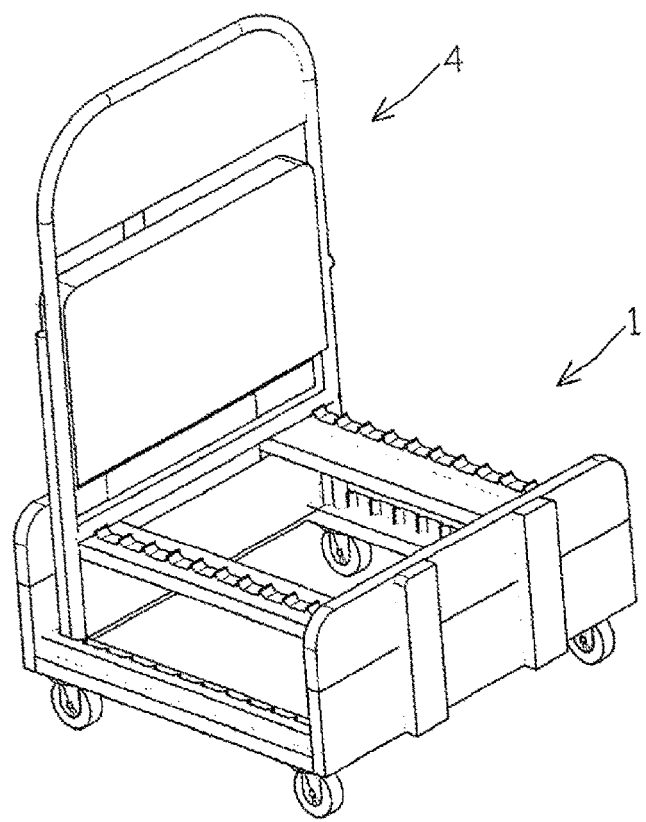
FIG. 9A is a perspective view showing the cart of FIG. 9 with the conventional first folding chair in their folded states being positioned on the cart.
Figure 9B:
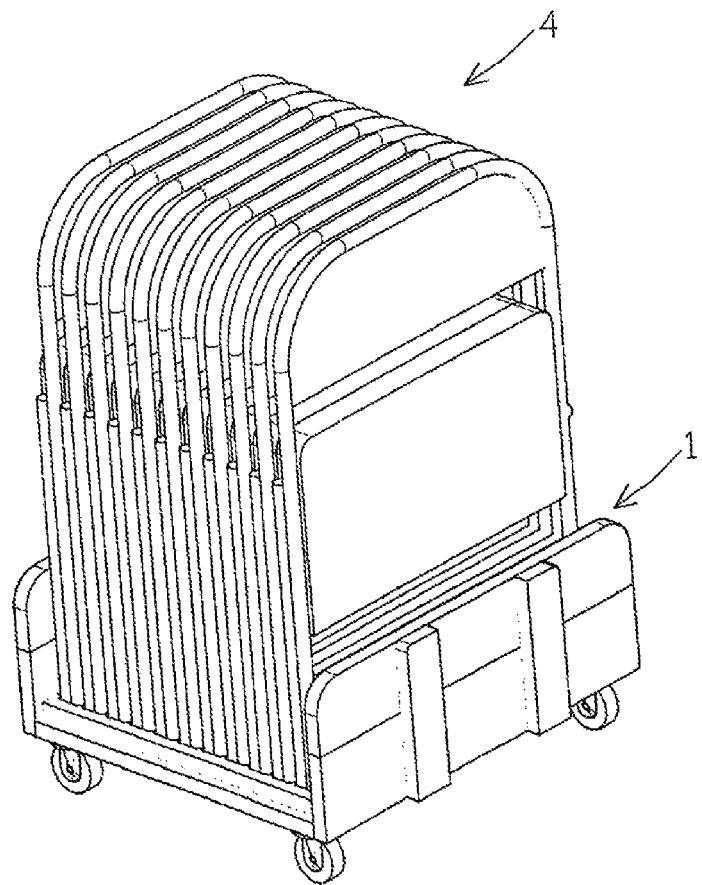
FIG. 9B is a view similar to FIG. 9A showing a plurality of the conventional first folding chairs in their folded states being positioned on the cart.

Referring to FIGS. 9 to 9B, a cart 1 for transporting folded tables and/or folded chairs in accordance with a fourth preferred embodiment of the invention is shown. The characteristics of the fourth preferred embodiment are substantially the same as that of the first preferred embodiment except the following: Both the front board and the rear board are rectangular, and a distance between the first trough 18 and its corresponding second trough 22 is slightly less than that between the first groove 17 and its corresponding second groove 21 so that a plurality of the conventional first folding chairs 4 can be positioned on the cart 1.

Figure 10:
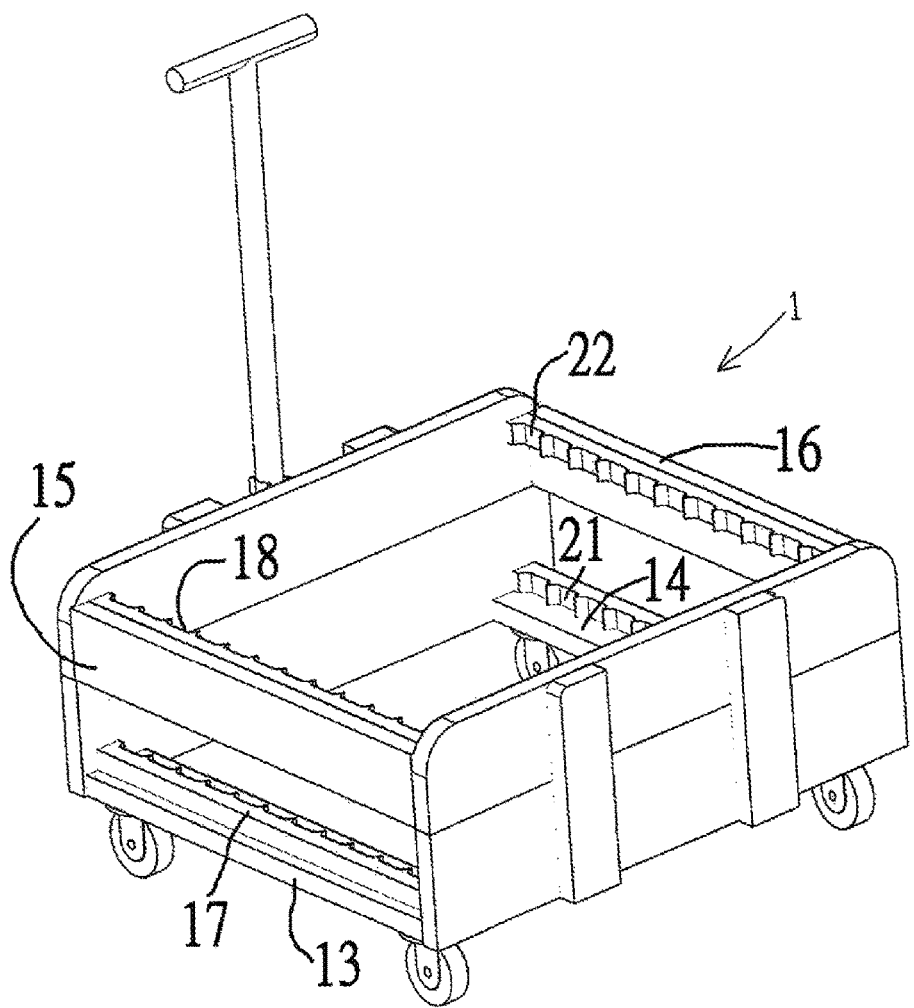
FIG. 10 is a perspective view of a cart for transporting folded tables and/or folded chairs according to a fifth preferred embodiment of the invention.
Figure 10A:
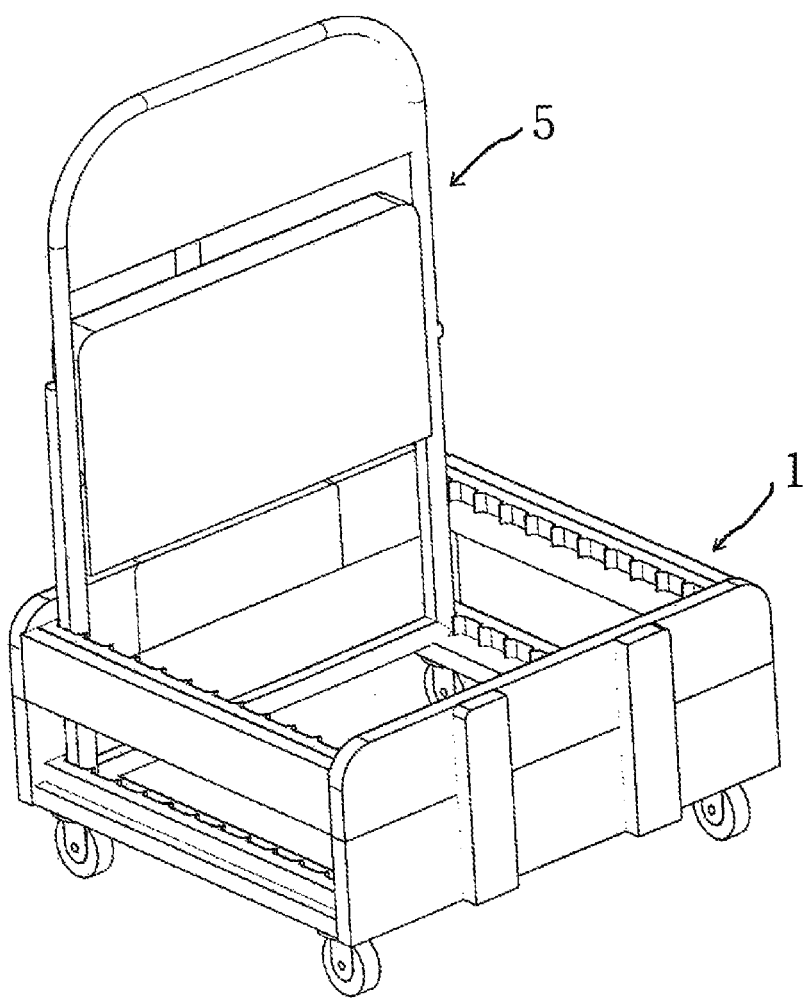
FIG. 10A is a perspective view showing the cart of FIG. 10 and the conventional second folding chair in its folded state being positioned on the cart.
Figure 10B:
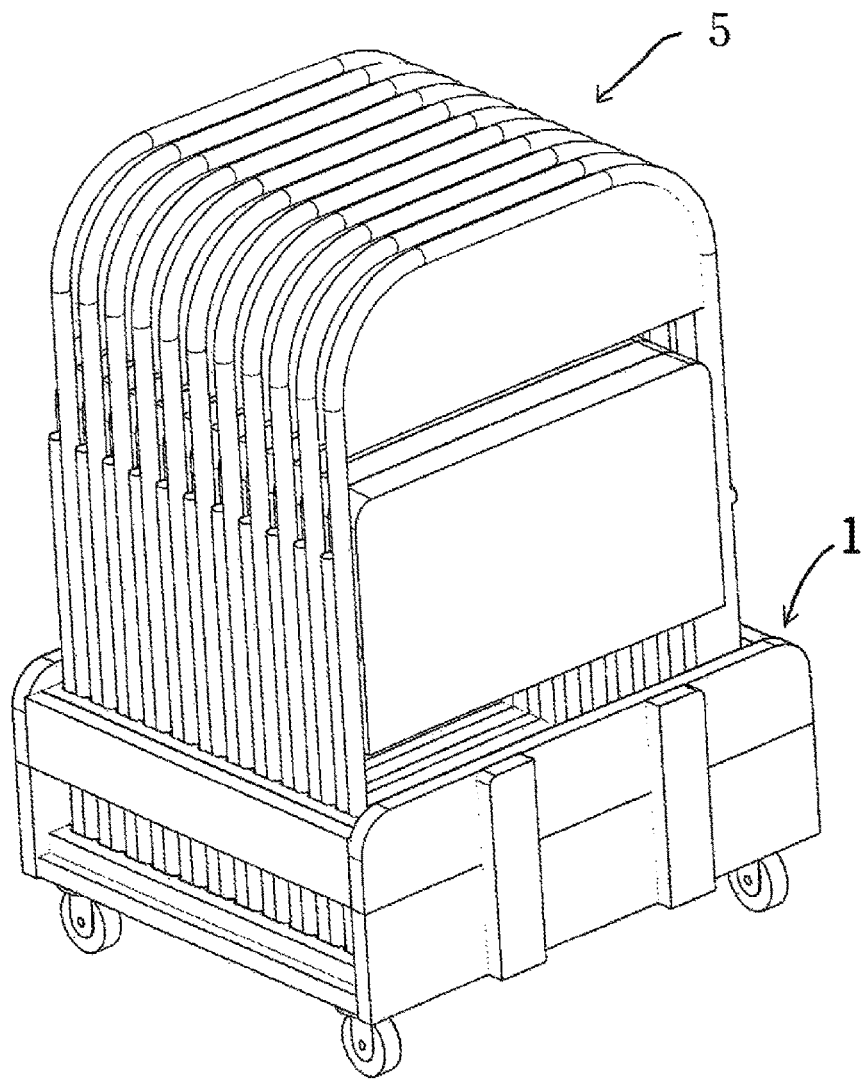
FIG. 10B is a view similar to FIG. 10A showing a plurality of the conventional second folding chairs in its folded state being positioned on the cart.

Referring to FIGS. 10 to 10B, a cart 1 for transporting folded tables and/or folded chairs in accordance with a fifth preferred embodiment of the invention is shown. The characteristics of the fifth preferred embodiment are substantially the same as that of the first preferred embodiment except the following: Both the front board and the rear board are rectangular, both the first troughs 18 and its corresponding second troughs 22 are vertically oriented, and a distance between the first trough 18 and its corresponding second trough 22 is equal to that between the first groove 17 and its corresponding second groove 21 so that a plurality of the conventional second folding chairs 5 can be positioned on the cart 1.

Figure 11:
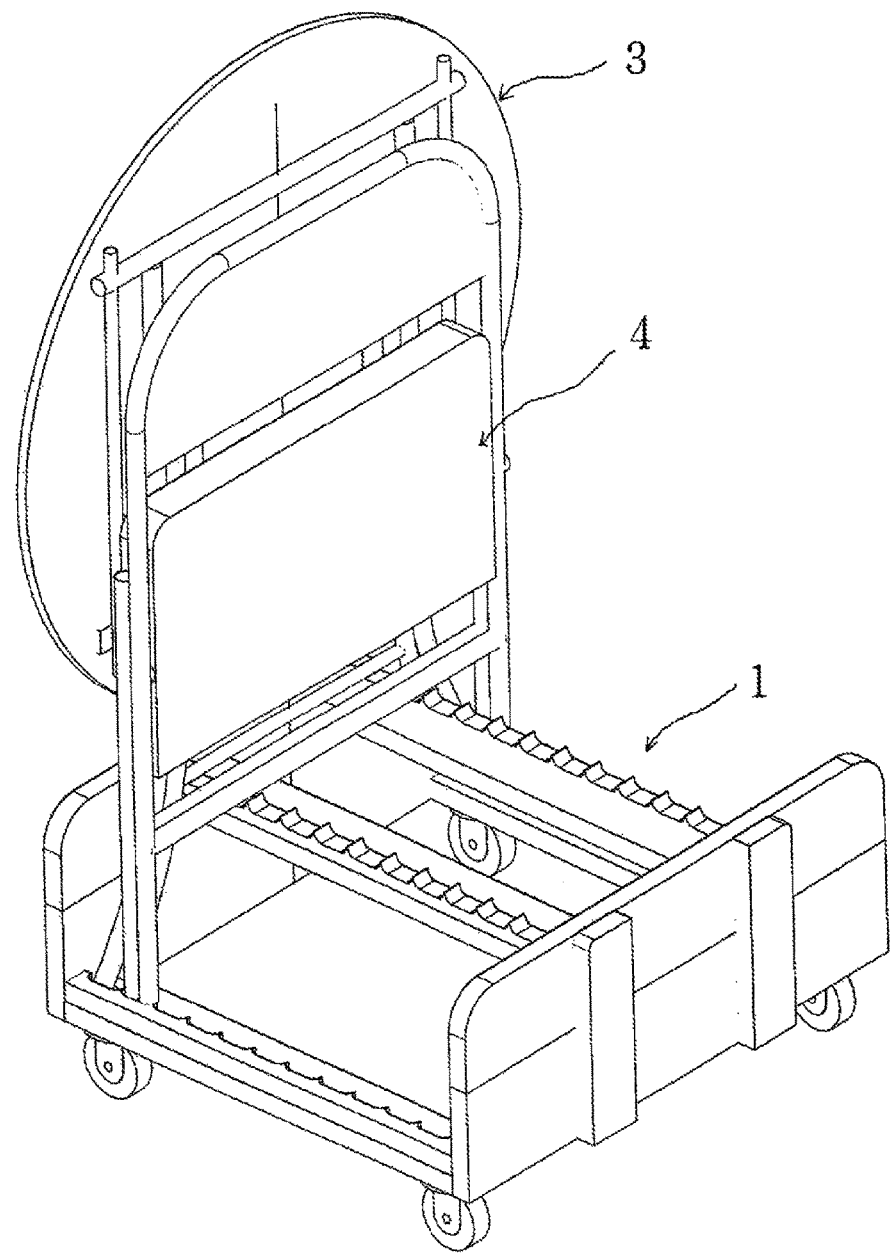
FIG. 11 is a perspective view of the cart of FIG. 7 showing both the conventional first folding table and the conventional first folding chair in its folded state being side by side positioned on the cart.
Figure 11A:
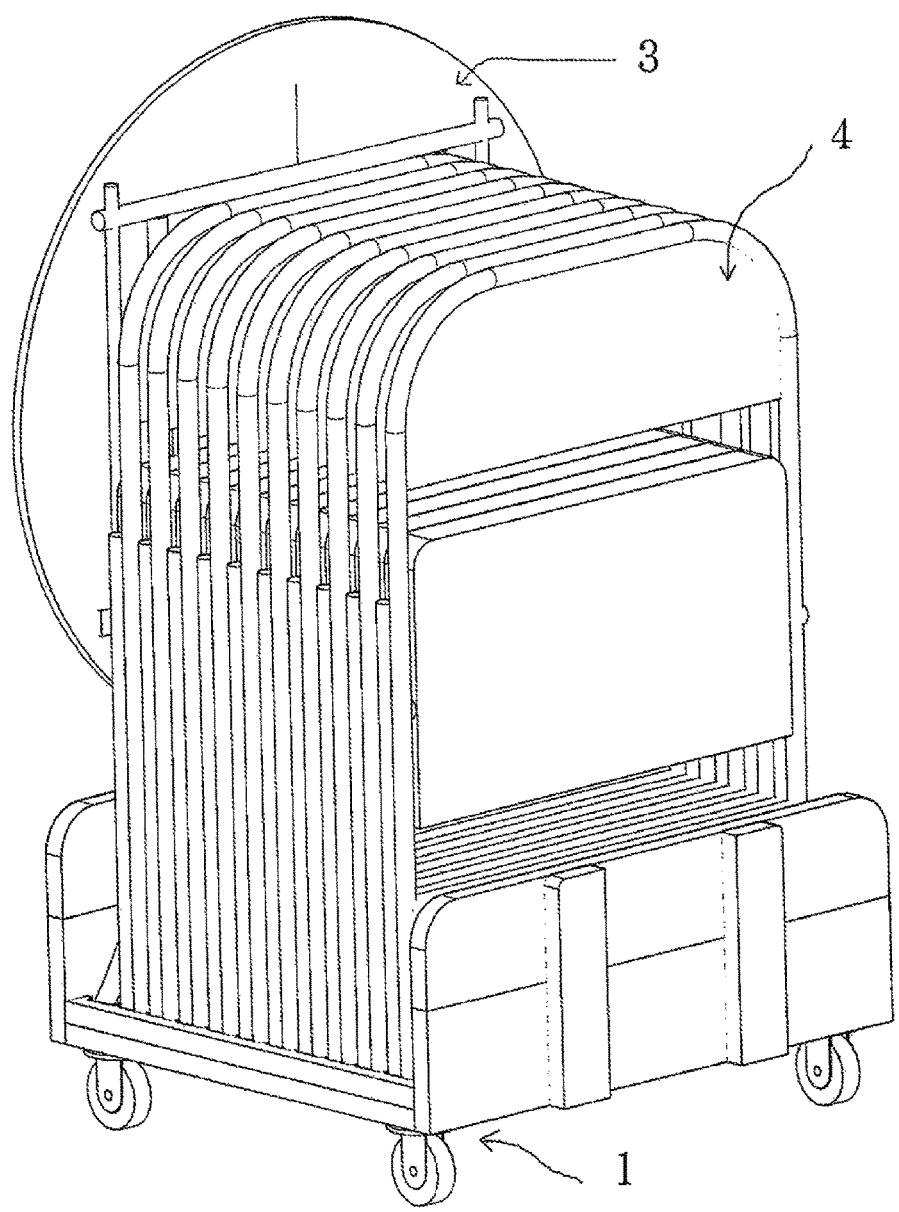
FIG. 11A is a view similar to FIG. 11 showing the conventional first folding table and the conventional first folding chairs both in its folded state being side by side positioned on the cart.
Figure 11B:
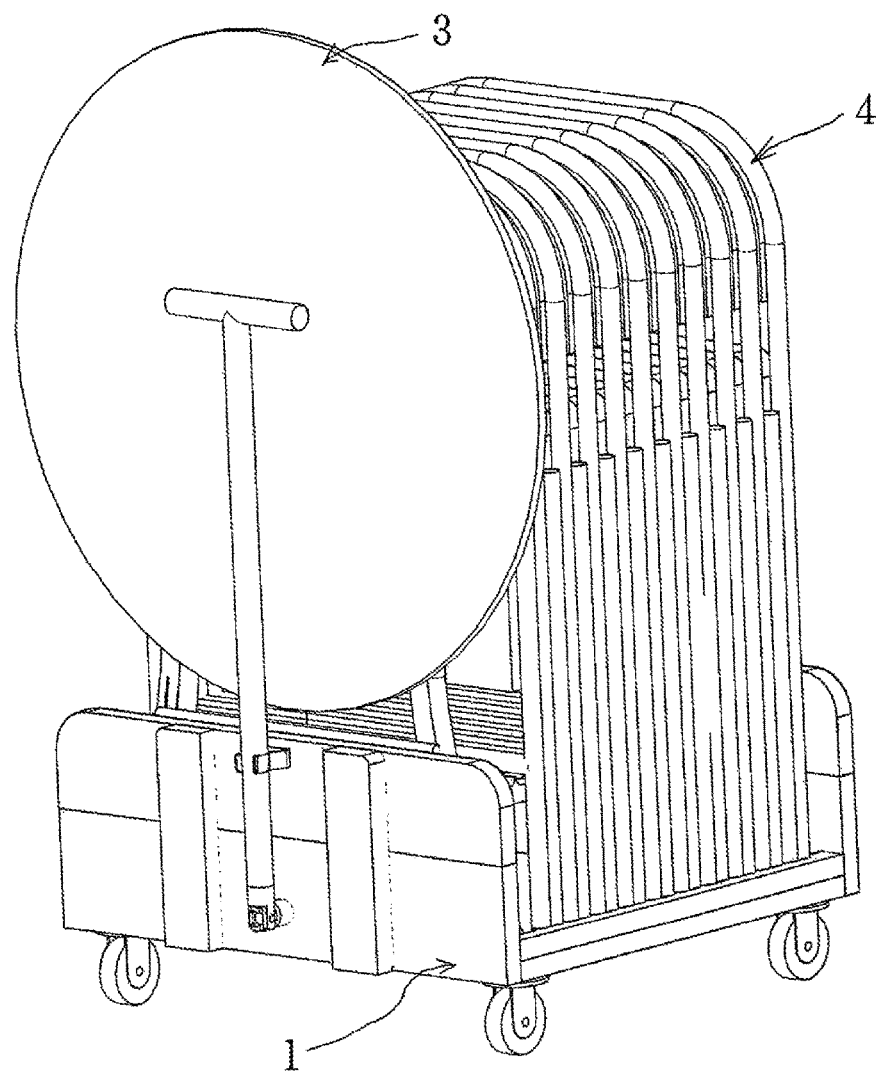
FIG. 11B is another view of FIG. 11A.

Referring to FIGS. 11 to 11B in which FIG. 11 is a perspective view of the cart 1 of FIG. 7 showing both the conventional first folding table 3 and the conventional first folding chairs 4 in its folded state being side by side positioned on the cart 1.

Figure 12:
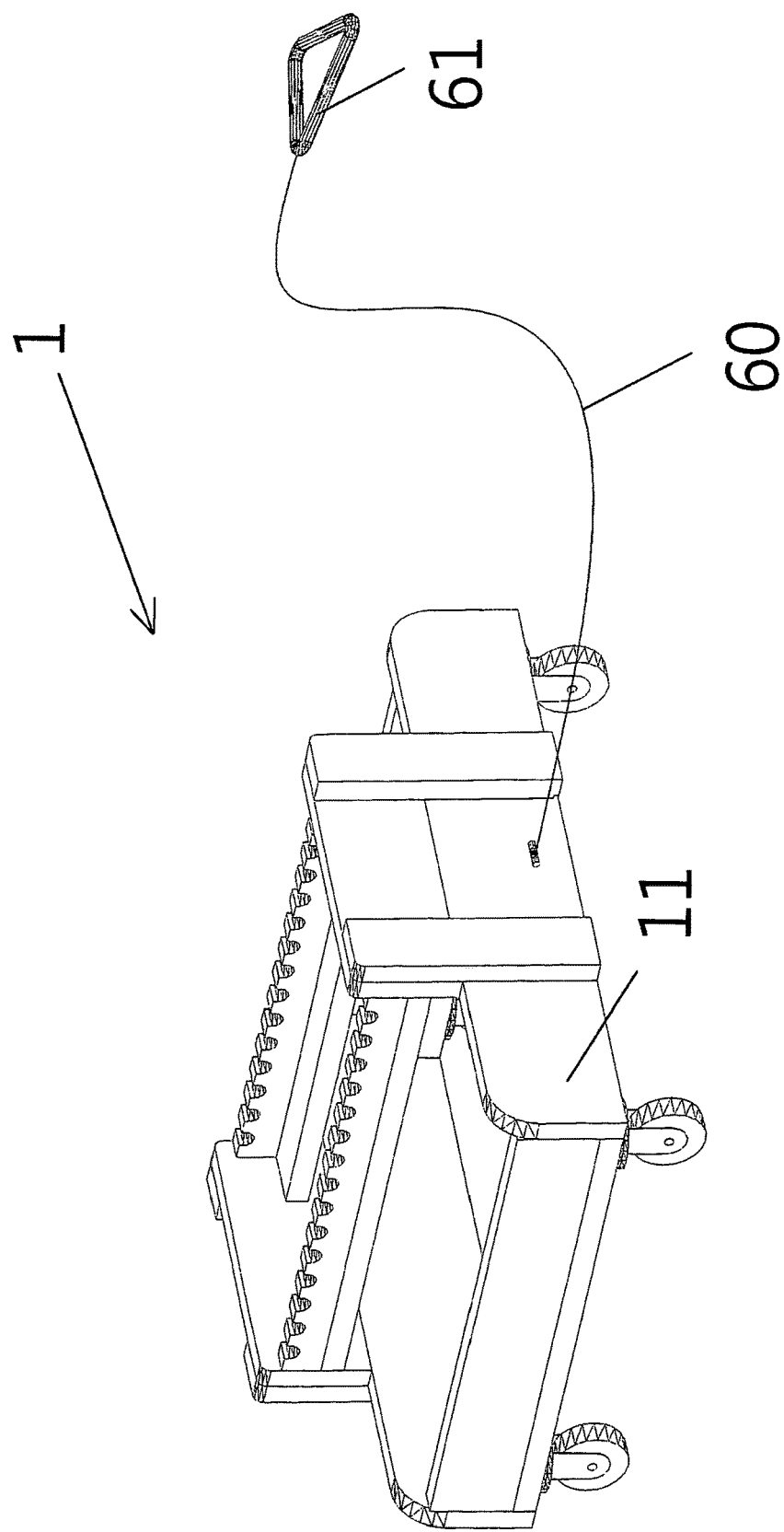
FIG. 12 is a perspective view of a cart for transporting folded tables and/or folded chairs according to a sixth preferred embodiment of the invention.

Referring to FIG. 12, a cart 1 for transporting folded tables and/or folded chairs in accordance with a sixth preferred embodiment of the invention is shown. The characteristics of the sixth preferred embodiment are substantially the same as that of the first preferred embodiment except the following: Both the T-shape handle and the fastener are removed and replaced by a rope 60 having one end secured to the lower central portion of the rear surface of the rear board 11 and a triangular handle 61 at the other end.

Figure 13:
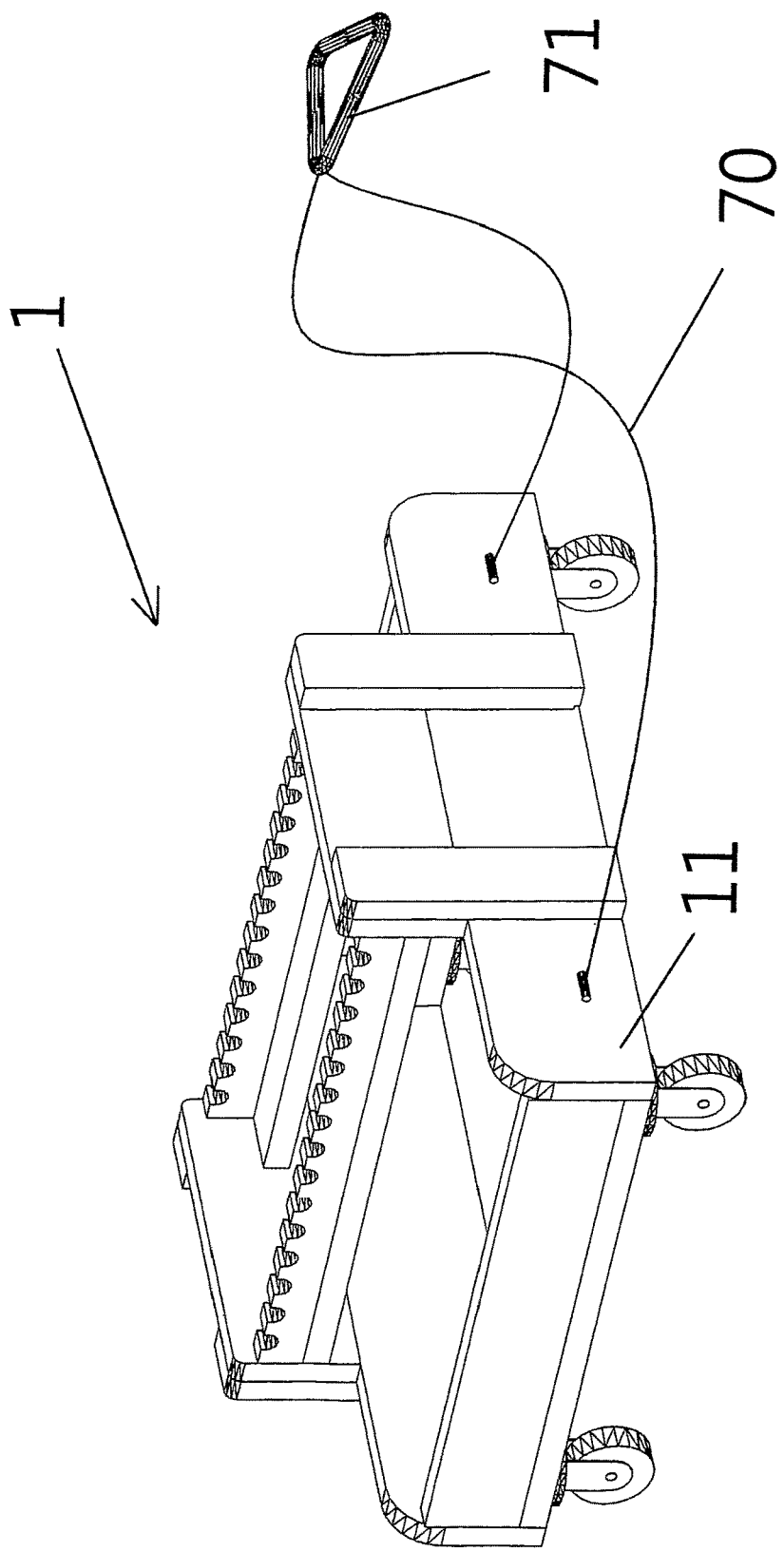
FIG. 13 is a perspective view of a cart for transporting folded tables and/or folded chairs according to a seventh preferred embodiment of the invention.

Referring to FIG. 13, a cart 1 for transporting folded tables and/or folded chairs in accordance with a seventh preferred embodiment of the invention is shown. The characteristics of the seventh preferred embodiment are substantially the same as that of the sixth preferred embodiment except the following: The rope is replaced by a bifurcated rope 70 having two first ends secured to two side positions of the lower portion of the rear surface of the rear board 11 respectively and a triangular handle 71 at a second end.

While the invention has been described in terms of preferred embodiments, those skilled in the art will recognize that the invention can be practiced with modifications within the spirit and scope of the appended claims.

What is claimed is:

1. A cart for transporting a plurality of folded tables and/or a plurality of folded chairs, comprising:
a rear board;
a front board;

a lower left side bar interconnecting both the rear board and the front board;

a lower right side bar interconnecting both the rear board and the front board;

a plurality of wheels rotatably mounted on both the lower left side bar and the lower right side bar;

a plurality of first grooves formed on an upper side of the lower left side bar and facing inward in a horizontal direction, wherein a width of the lower left side bar is greater than a depth of each of the first grooves to form a first step;

a plurality of second grooves formed on an upper side of the lower right side bar and facing inward in a horizontal direction, wherein a width of the lower right side bar is greater than a depth of each of the second grooves to form a second step;

an upper left side bar unremovably interconnecting both the rear board and the front board;

an upper right side bar unremovably interconnecting both the rear board and the front board;

a plurality of first troughs oriented in a predetermined direction and formed on the upper left side bar;

a plurality of second troughs oriented in a predetermined direction and formed on the upper right side bar;

a fastener disposed on a rear surface of the rear board; and a handle having a bottom end pivotably secured to the rear surface of the rear board and configured to be fastened by the fastener;

wherein the first grooves are apart from the second grooves, openings of the first grooves are directed toward those of the second grooves, each of the first grooves is aligned with a corresponding one of the second grooves, and each of the first troughs is aligned with a corresponding one of the second troughs.

2. The cart of claim 1, wherein the predetermined direction of the first trough is horizontal, and the predetermined direction of the second trough is horizontal.

3. The cart of claim 1, wherein the predetermined direction of the first trough is vertical, and the predetermined direction of the second trough is vertical.

\* \* \* \* \*